United States Patent [19]
Olson

[11] 3,840,082
[45] Oct. 8, 1974

[54] DRIVE ASSEMBLY AND SUSPENSION FOR GROUND-SUPPORT VEHICLES

[75] Inventor: Louis Harold Olson, Fond du Lac, Wis.

[73] Assignee: Brunswick Corporation, Skokie, Ill.

[22] Filed: Nov. 17, 1972

[21] Appl. No.: 307,400

[52] U.S. Cl.................... 180/5 R, 180/954, 305/27
[51] Int. Cl........................................... B62m 27/02
[58] Field of Search............ 180/5 R, 9.54; 267/34; 305/24, 27, 32

[56] References Cited
UNITED STATES PATENTS

| | | | |
|---|---|---|---|
| 1,894,619 | 1/1933 | Knickerbocker | 180/5 R |
| 2,323,526 | 7/1943 | Eliason | 180/5 R X |
| 2,483,430 | 10/1949 | Pierce | 267/34 |
| 2,925,873 | 2/1960 | Laporte | 180/5 R |
| 3,019,061 | 1/1962 | Schomers | 305/32 |
| 3,703,936 | 11/1972 | Padwick | 180/5 R |
| 3,705,637 | 12/1972 | Harvey | 180/5 R |
| 3,707,198 | 12/1972 | Pierson | 180/5 R |
| 3,774,706 | 11/1973 | Kiekhaefer | 180/5 R |
| R26,775 | 1/1970 | Smieja | 180/5 R |

OTHER PUBLICATIONS

"Skiroule Gives you the Competitive Edge" Advertising brochure of Skiroule, Wickham, Que. Canada 5/21/71.

Primary Examiner—Richard J. Johnson
Attorney, Agent, or Firm—William G. Lawler, Jr.; Roy T. Montgomery

[57] ABSTRACT

A ground-support vehicle such as snowmobiles includes a chassis-frame assembly with a bottom tunnel within which a drive track assembly is located. The track assembly includes a frame which is pivotally supported at a forward drive connection to the chassis assembly. A pair of spring-loaded shock absorbers are interconnected between the side rails and the rear of the chassis frame and constitutes the support of the pivotally mounted drive assembly to the chassis assembly. The track assembly includes the endless flexible track looped about a front drive sprocket and rear idler unit, with bogey wheels or sliders located therebetween. The bogey wheels are paired and pivotally mounted to opposite sides on a lateral shaft to freely pivot with the forces transmitted through the flexible belt. The idler unit is releasably and pivotally attached to the side rails. When released, the assembly can be pivoted forwardly to release the tension on the track.

20 Claims, 9 Drawing Figures

PATENTED OCT 8 1974

DRIVE ASSEMBLY AND SUSPENSION FOR GROUND-SUPPORT VEHICLES

Background of the Invention

This invention relates to an improved drive track and suspension assembly and its support connection to a chassis structure of a ground-support vehicle.

In various ground-support vehicles such as snowmobiles, an upper chassis and frame assembly includes a lower drive track assembly interconnected as the propulsion means. Generally, such assemblies include an endless flexible drive track which is entrained over a forward drive means and rear idler means with bogey wheels or slides interconnected to engage the lower run of the track. Bogey wheels are generally hinged to the chassis assembly or to separate frame from the connection to the main frame, and spring loaded. Each of the bogey wheel units is generally a separate entity or assembly which is constructed with sufficient tension to support the vehicle as well as the passengers. Similarly, in a slide type construction, the interconnecting members are spring loaded as a part of the drive sub-assembly to urge the slide into tensioned engagement with the bottom run of the track. Such systems maintain the lower run of the track in a relatively flat condition in order to maintain optimum surface or ground engagement. Although such systems have been widely employed, they involve relatively complicated structures which present time consuming and difficult maintenance and adjustment procedures.

Further, in snowmobiles and the like, there is a tendency under certain snow conditions to encounter a "build-up" of snow and ice within the upper tunnel area. Excessive build-up presents a potential track clogging condition, particularly in view of the limited clearance which is normally provided between the upper wall of the tunnel and the track. Under certain severe conditions, the entire vehicle is removed to a heated building in order to permit the clogged build-up of snow and ice to thaw. Alternatively, the entire series of bogey and idler means or the like are removed to permit access to the built-up material, which can then be chopped out. The total drive unit is then reassembled with the chassis structure.

SUMMARY OF THE PRESENT INVENTION

The present invention is particularly directed to an improved flexible track assembly for use with ground-support vehicles such as snowmobiles, terrain vehicles, small tractors and the like. Generally, in accordance with the present invention the drive track and suspension apparatus is constructed as a self-contained sub-assembly of the drive track and guide means interconnected to a track frame unit. The sub-assembly includes the frame unit which is pivotally mounted to the chassis and main frame assembly on the drive axis to permit relative pivotal movement between the total sub-assembly and the chassis structure while maintaining drive coupling. Resilient supporting shock absorber means interconnect the sub-assembly frame unit to the chassis and constitute the supporting connection therebetween. The shock absorber means are preferably designed and constructed with a suitable preload to support the weight of the chassis assembly as well as the normal passenger load, and may of course be made adjustable for adjustment to varying passenger loads.

Adjustable shock absorbers also permit adjustment to maintain the optimum attitude of the chassis while maintaining sufficient and proper front ski ground pressure. Applicant has found that the pivotally connected and mounted separate sub-assembly with the separate shock absorber means produces a highly improved and softer riding vehicle which significantly reduces the shocks transmitted from the terrain to the passengers. Thus severe bumps and contour changes result in the track sub-assembly being deflected upwardly within the tunnel, with the shock forces being absorbed by the shock absorber means which minimize the effect of the shock being transmitted to the chassis and the passengers. The drive track system can employ bogey wheels units having a pair of interconnected fore and aft wheels which are centrally mounted to pivot about a suitable cross bar within the sub-assembly. The track is held in a normal ground engaging position but is readily allowed to move over the contours of the snow and/or ground as a result of rocking of the suspension or bogey wheels. As the wheels do not have to be spring loaded, an idler assembly can be readily adjusted to maintain a constant track tension at all times and independent of the passenger load, the driving connection and the like.

The rear idler means is, in accordance with a further novel aspect of the present invention, releasably interconnected to the frame by pivotally mounted guide members. The guide members are releasably secured in a running position for maintaining proper track movement. When released, the guide members are pivotal forwardly to an over center position which unlocks and reduces the tension in the track and permits ready removal from the frame for servicing and the like.

The track drive means extends axially of the track with a releasable connection, such as splined shaft, to permit an essentially plug-in type interconnection of the track drive means to the chassis mounted drive source. If track or other component failure is encountered, the total sub-assembly is quickly released from the vehicle for servicing. The construction of the drive assembly as a sub-assembly also adapts the present invention to modern production processes and permits the convenient and rapid initial construction as well as subsequent servicing.

BRIEF DESCRIPTION OF THE DRAWINGS

The drawings furnished herewith illustrate a preferred construction of the present invention in which the above advantages and features are clearly disclosed as well as others which will be readily understood from the following description of such embodiment.

In the drawings.

DESCRIPTION OF ILLUSTRATED EMBODIMENT

Figure 1:
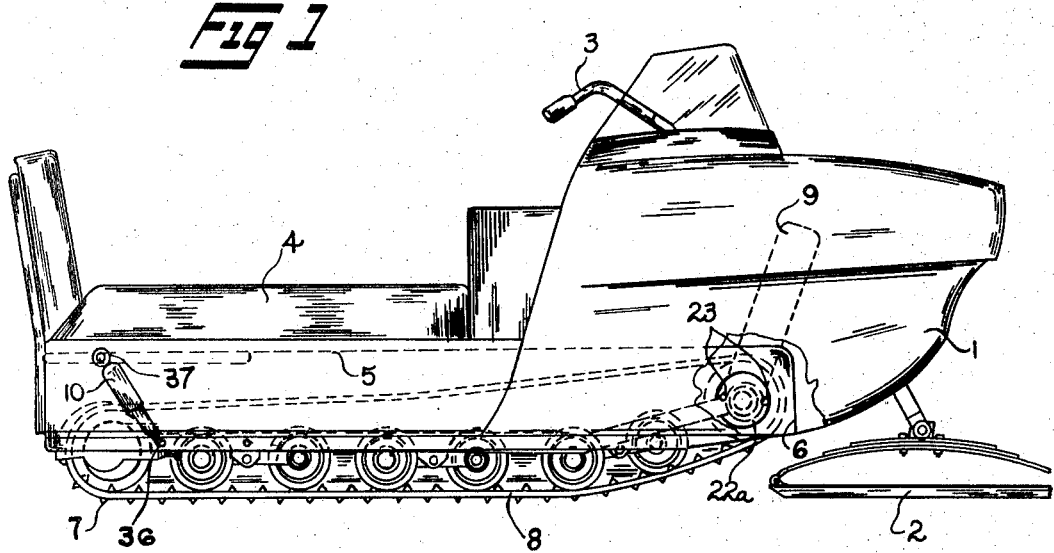
FIG. 1 is a side elevational view of a snowmobile with a track sub-assembly constructed and mounted in accordance with the present invention.
Figure 2:
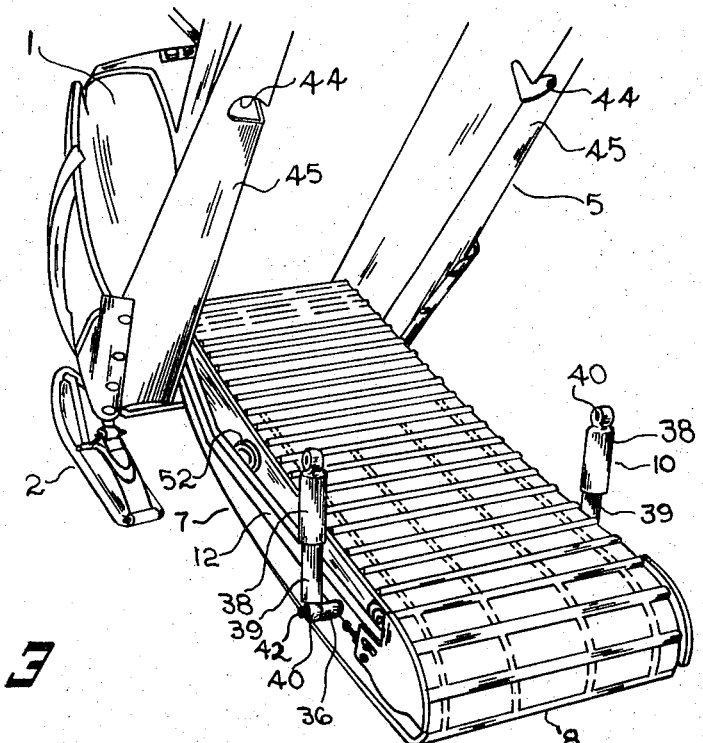
FIG. 2 is a side elevational view showing the chassis assembly pivoted with respect to the drive track sub-assembly.

Referring to FIGS. 1 and 2, the present invention is shown applied to a snowmobile including a forward cowl and housing assembly 1 which is interconnected to and supported by a pair of transversely spaced ski runners 2. Handle bars 3 are secured within the housing 1 and suitably connected to the ski runners 2 for steering control of the vehicle by the operator. A seat portion 4 extends rearwardly from the housing 1 and is located on the upper surface of an inverted U-shaped chassis frame 5 which defines a tunnel 6 extending longitudinally from the rear portion of the vehicle to the intermediate underside of the housing 1.

A track sub-assembly 7 is located within the tunnel 6 and includes an endless flexible track 8 which is coupled to an internal combustion engine, not shown, within housing 1. The track sub-assemby 7 is especially constructed and interconnected to the chassis frame 5 in accordance with the teaching of the present invention. Generally, in accordance with illustrated embodiment of the present invention the track sub-assembly 7 is pivotally mounted within the forwardmost end of the tunnel and connected to a chain drive unit 9 with the drive and pivot being common to permit pivotal movement of the sub-assembly 7 with respect to the chassis 5 while maintaining drive connection. The track sub-assembly 7 extends rearwardly within the tunnel 6 and is interconnected as a unit to the chassis frame 5 in rearwardly spaced relation to the chain drive unit 9 by a shock absorbing means, shown as a pair of shock absorbers 10 and 11 located one on each side of the U-shaped chassis frame 5. The shock absorbers 10 and 11 is similarly constructed and provide a resilent connection between the drive assembly 7 and the chassis 5 for the balance of the snowmobile as such. Thus, shock forces are transmitted through the drive assembly to the chassis through the shock absorbers which significantly absorb such shock forces and minimize their transmission to the vehicle proper and particularly to the passengers. Further, the special mounting of the sub-assembly 7 permits simplification as well as improved manufacturing and servicing construction of the drive means. The track sub-assembly 7 can be formed as a completely separate sub-assembly which may be readily attached to the chassis by a pivot support assembly at the front end, and by shcok absorbers at the rear.

More particularly in the illustrated embodiment of the invention the sub-assembly 7 includes a pair of rigid side rails 12 and 13 which are laterally spaced and similarly formed. The rails 12 and 13 extend longitudinally along the opposite sides of the sub-assembly with the forward ends bent upwardly, and interconnected by a track drive sprocket unit 14. The intermediate portions of the side rails support a plurality of similar bogey wheel units 15. The trailing ends of the side rails 12 and 13 are interconnected by a special idler wheel unit 16. The endless track 8 is looped about the several units 14-16 and secured under tension, as hereinafter described, to define a ground engaging drive and support.

Figure 4:
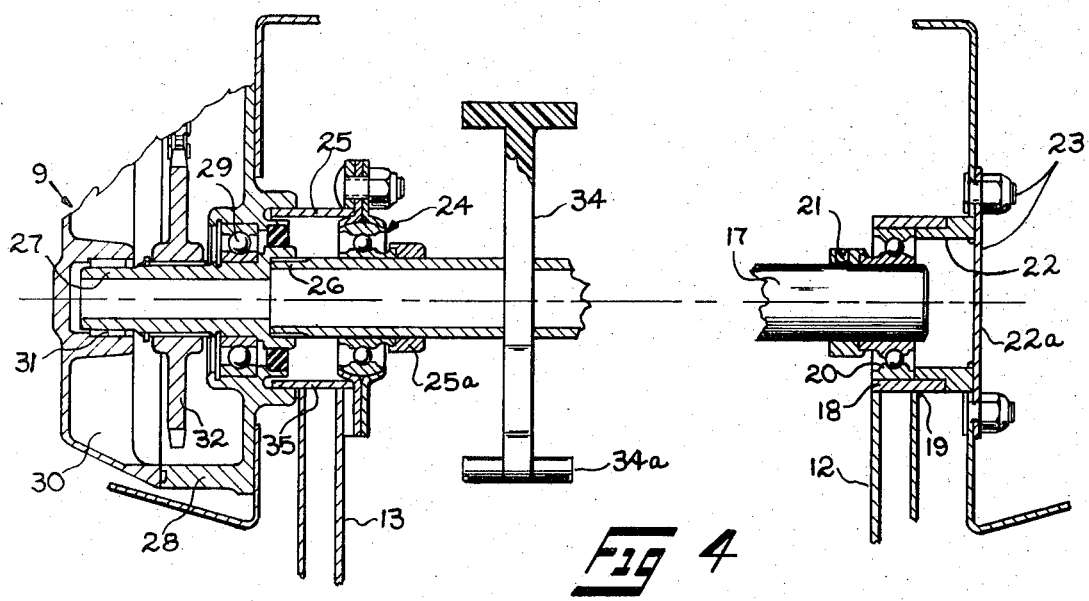
FIG. 4 is an enlarged vertical section taken generally on line 4—4 of FIG. 3.

The drive sprocket unit 14, as more clearly shown in FIG. 4, includes a shaft 17 which is rotatably secured to the forward end of the side rails 12 and 13 as follows. A bearing hub 18 is welded as at 19 to the rail 12. A roller bearing 20 is secured within the hub 18 with the inner face axially locked to the shaft by a suitable annular shoulder unit 21. The outer face of the hub 18 projects outwardly and mates with a tubular support 22 aligned with an opening in the frame 5. The support 22 includes a mounting plate 22a which is bolted as by a plurality of nut and bolt units 23 to the frame 5. This rotatably or pivotally supports the corresponding end of shaft 17 on the side rail 12 and frame 5 with a plug-in type connection provided by members 18 and 22.

The opposite end of shaft 17 is similarly rotatably supported by a roller bearing 24 attached to a hub 25 which is welded or otherwise secured to the forward end of the side rail 13 and projects laterally outwardly toward the chain drive unit 9. The roller bearing 24 is formed with suitable mounting flanges which are bolted or otherwise secured to the hub 25 to locate the roller bearing on the side rail 13. The bearing 24 is locked in the axial position by a similar collar means as 25a. The shaft 17 is thus also rotatably mounted in the side rail 13. The shaft 17 extends through the hub 25 and is provided with a splined end 26 which is coupled to an internally splined shaft 27 forming a part of the chain drive unit 9.

The chain drive unit 9 includes a cast housing or the like 28 which is bolted to the frame with a bearing 29 rotatably supporting the driven end of shaft 27. An outer cover portion 30 of the housing is bolted or otherwise secured to the housing 28 and includes an outer roller bearing 31 supporting the outer end of the shaft 27. A sprocket 32 is secured to shaft 27 and coupled by a chain 33 to the engine, not shown, which powers the track drive unit 14.

The drive unit housing 28 telescopes over the hub 25 as at 35 and pivotally supports the side rail 13 and shaft 17 with a plug-in type connection. A pair of drive sprockets 34 are clamped to the rotating shaft 17 in axially spaced relation and include lugs 34 mating with conventional projections on the inner surface of the flexible track 8 to provide continuous rotating of the endless track and movement of the snowmobile over the supporting ground.

The sub-assembly 7 is thus pivotally mounted at its front end by the roller bearings 20 and 24 about a common axis through the drive sprocket shaft 27 and the releasably coupled driving shaft 17. In the assembled relation, the track sub-assembly 7 may pivot about the pivot mounting of the shaft 17 with respect to the chassis assembly 5 as limited by the shock absorbers 10 and 11 and the depth of tunnel 6. Automobile type shock absorbers which telescope over a range of approximately inches have been found satisfactory. The tunnel 6 must be somewhat deeper than the more conventional unit to allow for this shock absorber travel to avoid track and frame engagement. With the shock absorbers 10 and 11 disconnected, the chassis frame 5 can be raised upwardly about the axis of the shaft 17 as shown in FIG. 2.

Figure 6:
FIG. 6 is an enlarged vertical section through a shock absorber unit shown in FIGS. 1–2.
Figure 8:
FIG. 8 is a fragmentary exploded view of the rear idler wheel mount.

Each of the shock absorbers 10 and 11 may be of any suitable resilient construction. The shock absorbers 10 and 11 are of conventional telescopic cylinder type as shown, with one end secured to a pivot pin 36 welded or otherwise fixed to the side rail 13 and the opposite end secured to a pivot pin 37 on the chassis frame 5. Referring to FIG. 6, each shock absorber includes a pair of telescoped cylinders 38 and 39 with conventional bushings 40 and 41 on the ends. Bushing 40 is releasably secured to the shaft 36 as by a snap ring 42 and the bushing 41 is similarly secured to pin or shaft 37. A coil spring 43 within the cylinders 38 and 39 preload the shock absorber to the expanded position. The telescoped cylinder members 38 and 39 extend through openings 44 in the laterally extending fender foot rest flanges 45 extending along the sides of the chassis 5. A preload rod 46 threads into the one cylinder such that selective rotation establishes preloading of the coil spring 43 and thereby preload of the shock absorbers to support the weight of the chassis 5 as well as any normal passengers to be carried by the snowmobile. A shock absorber is similarly secured to each side of the snowmobile to provide balanced support for the trailing end of the track sub-assembly 7.

To pivot the chassis 5 up and away from the track sub-assembly 7, as shown in FIG. 2, it is merely necessary to remove the snap rings 42 from the upper or lower shock supporting pins 36 or 37. This provides a very convenient method for servicing of the track assembly as well as permitting clearing of the tunnel in the event of abnormal buildup of snow, ice and the like.

Figure 3:
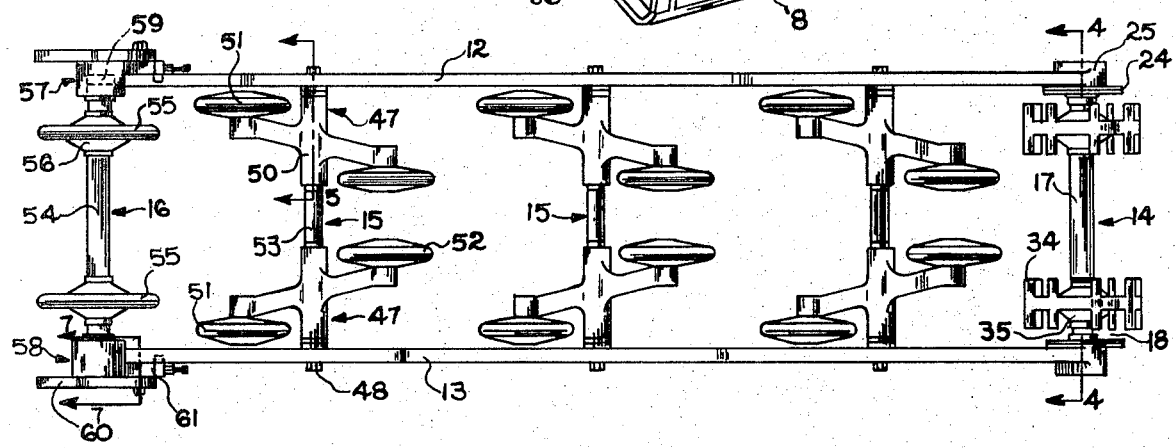
FIG. 3 is a horizontal fragmentary section through the snowmobile generally immediately above the drive track assembly, with parts of the track broken away to clearly illustrate the details of the construction.
Figure 5:
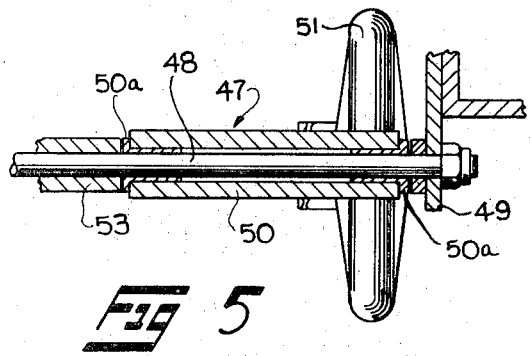
FIG. 5 is an enlarged vertical fragmentary section taken generally on line 5—5 of FIG. 3 and illustrating a novel wheel support construction.
Figure 7:
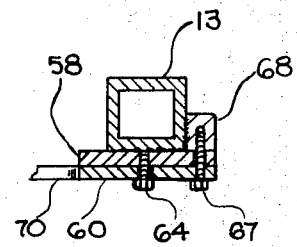
FIG. 7 is a fragmentary horizontal section taken generally on line 6—6 of FIG. 3 and illustrating the rear idler wheel construction and support as shown in FIGS. 1–3.

As shown in FIG. 3 and 5, the several bogey wheel units 15 are similarly constructed and each includes a pair of bogey wheel elements 47 pivotally mounted on a common shaft 48, in laterally spaced relation between the side rails 12 and 13. The wheel shaft 48 is secured at the opposite ends to the side rails 12 and 13 by depending flanges or mounting brackets 49 which may be welded or otherwise secured to the side rails and project downwardly to properly locate the wheels. Each of the bogey wheel elements 47 includes a common hub 50 rotatably mounted on the shaft 48 and carrying a pair of wheels 51 and 52 to the longitudinally opposite sides of the hub 50.

Suitable combined sleeve and thrust bearings 50a support the hubs 50 with a spacer 53 holding the wheel units in proper spaced relation between the side rails 12 and 13, as most clearly shown in FIGS. 3 and 5. The wheels 51 and 52 of each wheel element 47 are laterally offset with respect to each other such that with each pair of elements the rearward wheels 51 are adjacent to the corresponding side rails 12 and 13 and the forward wheels 52 are spaced inwardly adjacent the central portion of the track sub-assembly. The several wheels 51 and 52 mate with suitable grooves in the flexible track 8 to support the track.

Each of the bogey wheel elements 47 is free to rock on the cross shaft or axle 48 and permits the track 8 to move over the irregular contours of the supporting surface while maintaining constant tension in the track 8. As an individual bogey wheel elements rocks, one wheel releases tension while the other correspondingly increases the tension on the track 8 to thereby maintain a constant track tension under all operating conditions and independent of the load or the driving torque. This permits setting of the desired tension on the drive of the sub-assembly and avoiding the heretofor conventional requirement for the over-tensioning of the track in order to compensate for sag which occurs when weight is applied to the vehicle. The bogey wheel elements do not absorb the shock but merely transmit the shock forces through the assembly to the shock absorbers 10 causing the assembly to float with the shock absorbers absorbing the shock forces and minimizing the transfer to the chassis and passengers.

The tension of the track 8 is adjusted, in the illustrated embodiment of the invention, through the specially constructed idler unit 16 which is secured to the side rails 12 and 13 adjacent the trailing most end of the sub-assembly 7.

Referring particularly to FIGS. 3, 7, 8 and 9, the idler unit 16 includes a supporting shaft 54 with a pair of spaced idler wheels 55 interconnected to shaft by suitable clamping brackets 56. The opposite ends of the shaft 54 are supported in corresponding pivot housings 57 and 58 which include generally cylindrical hub portions within which radial bearings 59 are secured. The housings 57 and 58 are similarly constructed and consequently, the one housing is described in detail.

The housing 58 (FIG. 8) includes a forwardly projecting mounting plate 60 abutting in face to face relation to a plate 61 welded or otherwise rigidly secured to the side rail 13 and depending downwardly therefrom. The mounting plate 61 includes a tapped opening 62 vertically aligned with a longitudinal slot 63 in the plate 60. A clamping bolt 64 is adapted to pass through the slot 63 and into the threaded opening 62 to interconnect the plates. The plate 60 further includes an opening 65 aligned with a slot 66 in the plate 61 with an interconnecting bolt 67. A plate 68 is welded or otherwise attached to the front edge of plate 61 immediately below the rail 13. A tension control bolt 69 is threaded into the plate in alignment with the opening 65 and the slot 66 with the inner end abutting the bolt 67 to longitudinally locate the housing 59 and consequently the longitudinal position of the unit 16 with respect to the forward drive unit 17. This controls the tension on the flexible drive track 8.

Figure 9:
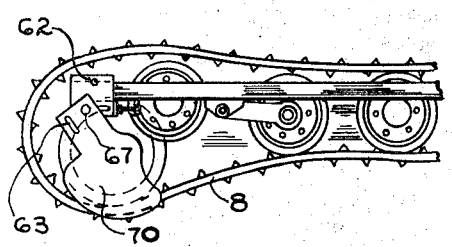
FIG. 9 is a side view of the rear portion of the track assembly showing the idler wheels pivoted to a track release position.

When it is desired to release the track, it is merely necessary to remove the bolt 64 which permits the unit 16 to pivot about the bolt 65 to the position shown in FIG. 9. In this position, the idler unit 16 and wheels 55 swing down and forwardly, releasing the tension on the track 8 and introducing sufficient slack so that the track may be easily removed from the supporting framework for servicing and the like. A radial flange 70 on housing 57 and 58 may be provided as a protective track guide for the adjacent edge of the track 8 as well as creating a manually operating handle portion for pivoting of the unit to the release position.

The present invention provides a novel floating beam suspension for a drive track assembly of ground-support vehicles such as snowmobiles, all terrain vehicles, small tractors and the like.

Various modes of carrying out the invention are contemplated as being within the scope of the following claims, particularly pointing out and distinctly claiming the subject matter which is regarded as the invention.

I claim:

1. A ground-support drive track and suspension apparatus for driven attachment to a chassis, including a main frame assembly, comprising: a rigid track frame having means for rotatably supporting thereon an endless track, drive shaft means rotatably mounted to said track frame for driving the track about a drive axis extending laterally of the track movement, substantially concentric pivot support means at the ends of said drive shaft having means for attachment to said rigid track frame and to said chassis to pivotally support said drive shaft and said track frame for pivotal movement about the drive axis, and a resilient shock absorber means coupled between said track frame and said chassis for conjointly with said pivot support means resiliently and pivotally supporting said track frame beneath said chassis.

2. The device of claim 1 wherein said shock absorber means includes a pair of telescoped members with an internal resilient means urging the members to an expanded position and having opposite end attachment means, one of said end attachment means being connected to the adjacent frame unit and the opposite end attachment member being connected to the chassis assembly to pivotally support the frame unit, at least one attachment being releasable.

3. The device of claim 2 wherein said resilient means is selectively preloaded.

4. A ground-support drive track and suspension apparatus for driven attachment to a chassis, including a main frame assembly, comprising; a frame having means for rotatably supporting thereon an endless track, means rotatably mounted to said frame for driving the track including a drive axis extending laterally of the track movement, pivot support means having means for attachment to said frame and to said chassis to pivotally support said frame for pivotal movement about the drive axis, and a resilient shock absorber means coupled between said frame and said chassis for conjointly with said pivot support means resiliently and pivotally supporting said frame beneath said chassis, wherein said pivot support means includes laterally spaced bearing supports each of said supports including a pair of telescoped annular members secured one each to the frame unit and to the chassis with their axis common to said drive axis.

5. The ground-support drive track suspension of claim 4 wherein said one bearing support has the one annular member integrally formed with a drive unit housing releasably attached to the chassis assembly and the other bearing support having the one annular member secured to a mounting plate having means for releasable attachment to the chassis assembly.

6. The ground-support drive track and suspension apparatus of claim 1 wherein said track support means includes a forward track support means and a rear track support means connected to forward and rear ends of said frame unit, said drive track means being rotatably mounted as a part of said forward track support means with a concentric input drive axis, and said pivot support means being connected to said forward track support means.

7. The ground-support drive track and suspension apparatus of claim 6 having bogey wheel means including a pair of longitudinal spaced and interconnected bogey wheels with a pivotally mounting means intermediate therebetween connected to said frame unit to locate the wheels in selective engagement with the bottom run of the track, said bogey wheel means pivoting to maintain a constant tension on said track as said tread moves over irregular surfaces.

8. The ground-support drive track and suspension apparatus of claim 6 having a plurality of bogey wheel means each including a pair of longitudinal spaced and interconnected bogey wheels with a pivotally mounting means intermediate therebetween connected to said frame unit to locate the wheels in selective engagement with the bottom run of the track, each of said bogey wheel means pivoting to maintain a constant tension on the said track as said tread moves over irregular surfaces.

9. The ground-support drive track and suspension apparatus of claim 6 wherein said rear track support means includes a track idler means and attachment means, a mounting means on the frame unit aligned with the attachment means, pivotal mount means interconnecting said attachment and mounting means, and releasable locking means interconnecting said attachment and mounting means to hold the means in operative relation and releasable to permit pivoting of the attachment means to release the tension on said track.

10. The ground-support drive track and suspension apparatus of claim 6 wherein said rear track support means includes an idler means rotatably mounted on a shaft means, said rear track support means including an attachment plate means abutting a mounting plate means on the side wall of the frame unit, pin and slot means interconnecting said plate means to permit longitudinal adjustment of the rear track support means, and releasable locking means interconnecting said plate means to hold the plate means in operative relation and releasable to permit pivoting of the attachment plate means and rear track support to release the tension on said track.

11. The ground-support drive track and suspension apparatus of claim 6 wherein said frame unit includes a pair of parallel and laterally spaced side frame members, said shock absorber means includes a pair of shock absorbers located one to each side of the frame unit, each shock absorber including a pair of telescoped members with an internal resilient means urging the members to an expanded position and having opposite end attachment means, one of said end attachment means being releasably connected to an adjacent frame member and the opposite end attachment member being connected to the chassis assembly to pivotally support the frame unit.

12. The ground-support drive track and suspension apparatus of claim 11 having a plurality of bogey wheel means each including a pair of longitudinal spaced and interconnected bogey wheels with a pivotally mounting means intermediate therebetween connected to said frame unit to locate the wheels in selective engagement with the bottom run of the track, each of said bogey wheel means pivoting to maintain a constant tension on said track as said tread moves over irregular surfaces.

13. The drive track and suspension apparatus of claim 4 wherein said rear track support means includes a plurality of laterally spaced idler wheels mounted on a rotatably shaft means, end bearing means for said shaft means, said bearing means including an attachment plate means abutting a mounting plate means on the side wall of the frame unit, pin and slot means interconnecting said plate means to permit longitudinal adjustment of the rear track support, and releasable locking means interconnecting said plate means to hold the plate means in operative relation and releasable to permit pivoting of the attachment plate means and rear tread support to release the tension on said track.

14. In a vehicle, a chassis assembly including an inverted U-shaped rear chassis frame defining an elongated longitudinal tunnel with depending side walls, a track drive sub-assembly located within said tunnel with a front track support and drive shaft assembly having an input shaft, said shaft assembly including a pivot support means at the opposite ends having a common axis with said input shaft and releasably connected with a complementing pivot means on said chassis assembly, said one complementing pivot means including a common support for a drive shaft means aligned with and releasably engageable with said input shaft whereby said drive sub-assembly pivots as a unit about said common axis, and a shock absorber means connected to said chassis frame and to said sub-assembly and supporting said sub-assembly in said tunnel for pivotal movement about said shaft assembly.

15. The vehicle of claim 14 wherein said sub-assembly includes a pair of side rails with said shaft assembly connected to the forward end, a rear idler including a shaft rotatably mounted at the opposite ends to the rear ends of said side rails and being longitudinally adjustable to control the tension in said track, a plurality of bogey wheel units located in longitudinal spaced relation between said drive shaft unit and said idler unit, each bogey wheel unit including a bogey pivot shaft secured to said side rails with a pair of spaced bogey wheel elements pivotally mounted on the corresponding bogey pivot shaft, each bogey wheel element including a support hub journaled on the shaft and a pair of oppositely extending and laterally offset arms with bogey wheels supported on the outer end of each arm and located to engage the bottom run of the endless track.

16. The vehicle of claim 15 wherein said side rails include plates slidably abutting said guide plates on said idler unit, said guide plates having a longitudinal slot and a vertically spaced opening, the rail plates having a longitudinal slot aligned with the opening of the guide plate and an opening aligned with the slot of the guide plate, individual pin means extending through the aligned slot and openings, a tension rod releasably secured to the side rails in alignment with one of said pin means to adjustably space said guide plates to control the tension of said track, corresponding ones of said pin means being removable from each of said overlapping plates to permit pivotal forward movement of the rear idler assembly for removal of tension from said track.

17. In a vehicle, a chassis assembly including an inverted U-shaped rear chassis frame defining an elongated longitudinal tunnel with depending side walls, a track drive sub-assembly located within said tunnel with a front track support and drive shaft assembly having an input shaft and a rear track idler assembly secured to a pair of supporting side rails and with a plurality of bogey wheel assemblies secured to the side rails between said front and rear assemblies and with an endless flexible track looped about said assemblies, said shaft assembly including a pivot support means at the opposite ends having a common axis with said input shaft including tubular means telescoped into complementing tubular support means including a common support for an input drive shaft means aligned with the releasably slidably engageable with said input shaft whereby said drive sub-assembly pivots as a unit about said common axis, said complementing tubular support means being bolted to said chassis frame and establishing a plugin mounting of the pivot support means, each of said bogey wheel assemblies including a bogey pivot shaft secured to said side rails with a pair of spaced bogey wheel elements pivotally mounted on the corresponding bogey pivot shaft, each bogey wheel element including a support hub journaled on the shaft and having a pair of oppositely extending and laterally offset arms with bogey wheels supported on the outer end of each arm and located to engage the bottom run of the endless track, said idler assembly including end guide plates, side rails include rail plates slidably abutting said guide plates, said guide plates having a longitudinal slot and a vertically spaced opening, the rail plates having a longitudinal slot aligned with the opening of the guide plate and an opening aligned with the slot of the guide plate, individual coupling bolt means extending through the aligned slot and openings, a tension bolt threaded to the side rails forwardly of and in alignment with one of said coupling bolt means and defining a locating stop for such coupling bolt means to adjustably space said guide plates to control the tension of said track, corresponding ones of said bolt means being removable from each of said overlapping plates to permit pivotal forward movement of the rear idler assembly for removal of tension from said track, a pair of shock absorbers connected one each to each side rail and the adjacent side wall of the chassis frame, each shock absorber including a pair of telescoped cylinder members with an internal coil, each of said cylinders having end bushings mating with mounting shafts on said side rails and said chassis frame, and means releasably secured to the ends of the mounting shafts to releasably lock the absorber in position.

18. A track drive apparatus adapted to connect to a vehicle chassis to define a ground support, comprising a track assembly including an endless track means suspended upon a support between longitudinally spaced rotatable means, pivotal mounting means connecting at least one of said rotatable means to said support and including means to hold the rotation means in a first position with said track means under tension and releasably to allow pivoting of the rotatable means to a second position to release the tension on said track means, said one rotatable means being a rear idler assembly including a shaft rotatably mounted at the opposite ends in a pair of guide arms having forwardly projecting guide plates, said support means having side plates slidably abutting said guide plates, said guide plates having a longitudinal slot and a vertically spaced opening, said side plates having a longitudinal slot aligned with the opening of the guide plate and an opening aligned with the slot of the guide plate, individual pin means extending through the aligned slot and openings, a tension rod releasably secured to the side rails in alignment with one of said pin means to adjustably space said guide plates to control the tension of said track, corresponding ones of said pin means being removably from each of said overlapping plates to permit pivotal forward movement of the rear idler assembly for removal of tension from said track.

19. A track drive apparatus adapted to connect to a vehicle chassis to define a ground support, comprising a track assembly including an endless track means suspended upon a rigid support between longitudinally spaced rotatable means, pivotal mounting and input drive means connecting at least one of said rotatable means to said rigid support and including an axial in-line drive coupling means, and intermediate bogey wheel means including a pivot support extending laterally of the track means and having fore and aft bogey wheels connected for simultaneous and corresponding pivotal movement whereby the track means is maintained under constant tension with the pivotal movement of said bogey wheel element.

20. The track drive apparatus of claim 19 wherein including a plurality of bogey wheel means, each bogey wheel means having a supporting shaft with a pair of laterally spaced bogey elements with a hub journaled on said shaft, each element having said fore and aft bogey wheels secured to said hub by supporting arms.

* * * * *